(No Model.)
J. T. STRONG.
HARROW AND PULVERIZER ATTACHMENT.
No. 349,374. Patented Sept. 21, 1886.
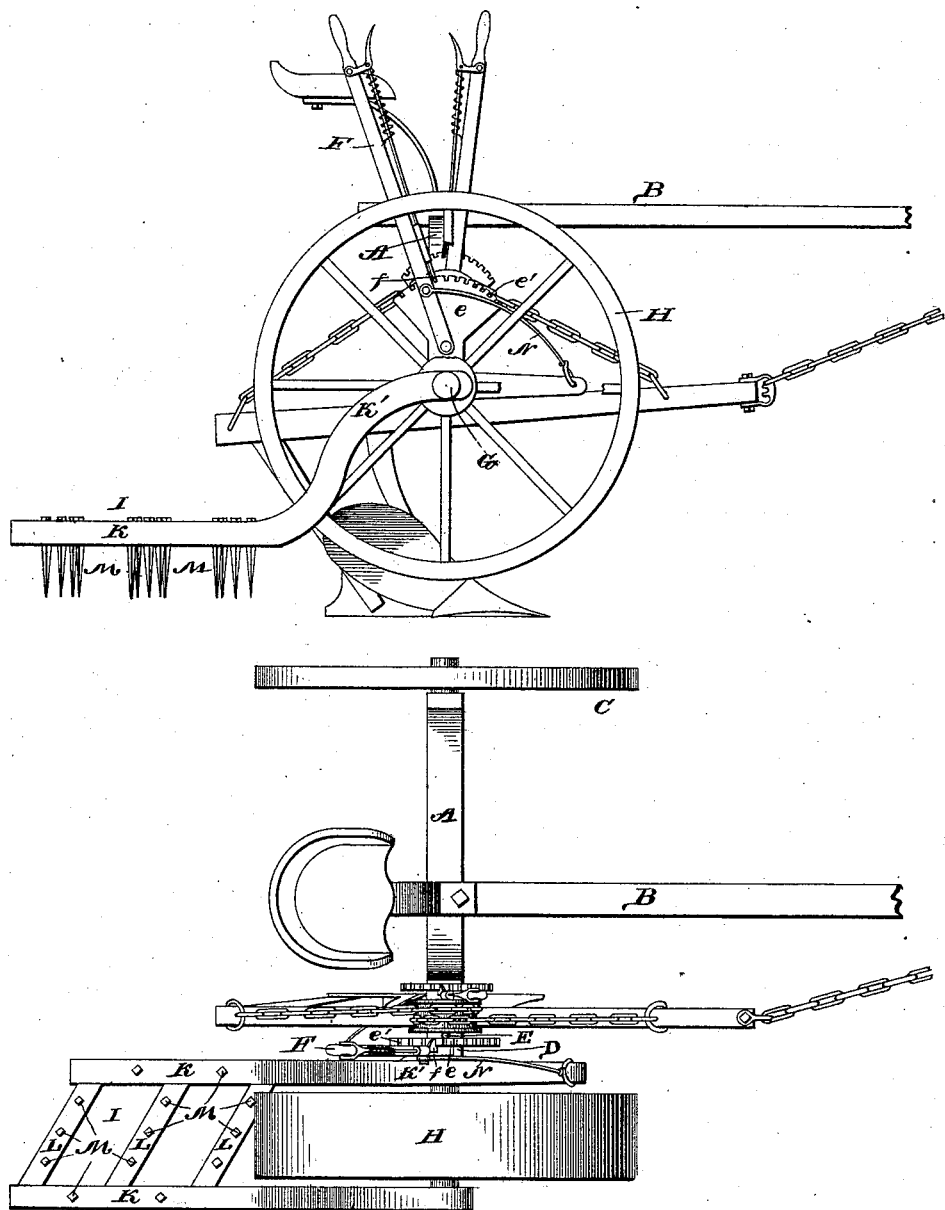

UNITED STATES PATENT OFFICE.

JAMES THORNTON STRONG, OF PITTSBURG, KANSAS, ASSIGNOR OF ONE-FOURTH TO M. S. THURMOND, OF SAME PLACE.

HARROW AND PULVERIZER ATTACHMENT.

SPECIFICATION forming part of Letters Patent No. 349,374, dated September 21, 1886.

Application filed June 18, 1886. Serial No. 205,569. (No model.)

*To all whom it may concern:*

Be it known that I, JAMES THORNTON STRONG, a citizen of the United States, residing at Pittsburg, in the county of Crawford and State of Kansas, have invented a new and useful Improvement in Harrow and Pulverizer Attachments, of which the following is a specification.

My invention relates to an improvement in harrow and pulverizer attachments for sulky-plows; and it consists in the peculiar construction and combination of devices, that will be more fully set forth hereinafter, and particularly pointed out in the claims.

In the drawings, Figure 1 is a side elevation of my improvements attached to a sulky-plow. Fig. 2 is a top plan view of the same.

A represents the usual arched axle, B represents the tongue, and C represents one of the supporting-wheels, of an ordinary sulky-plow. The other wheel of the plow is removed from the opposite spindle of the axle, and on the said spindle is secured a block, D, which is provided with an opening to receive the spindle, and a pin, E, passes transversely through the said block and through the spindle, in order to secure the block firmly in place. From the upper side of the block, near the outer end thereof, projects a vertical segment-plate, e, which is provided with the usual notches, e'.

F represents a hand-lever, which is pivoted to the segment-plate, and is provided with a locking-bolt, f, which is adapted to engage either of the notches in the segment-plate, in order to lock the lever at any desired position.

G represents a spindle, which is inserted in the opening in the outer end of the block D, and is thereby attached to the axle and forms the continuation of the spindle from which the supporting-wheel of the sulky-plow has been removed. On the said spindle G is mounted a roller-wheel, H, which is of the same diameter as the supporting-wheels of the sulky-plow; but the rim of the said wheel H is very much broader than the rims of the supporting-wheels, the width of the wheel H being equal to the width of the furrow made by the plow.

I represents the harrow, which comprises the two side beams, K, having the forward upwardly-curved extensions K', which are pivoted or hinged to the spindle G, one on each end of the hub of the roller-wheel H. The side beams, K, have their rear ends connected together by means of diagonally-arranged cross-beams L, and through the said cross-beams, and also through the rear ends of the beams K, project removable harrow-teeth M, which are of the usual well-known construction. These harrow-teeth, it will be noted, are adapted to work immediately in rear of the roller-wheel H, so as to stir and pulverize the soil which is rolled by the roller. By pivoting the harrow to the spindle G, it will be observed that the harrow is trailed in rear of the wheel H, and that the harrow is free to be raised vertically from the ground. A rod, N, connects the upper projecting end of the inner side beam K to the hand-lever F, so that the harrow may be raised from the ground by moving the said lever, as will be very readily understood.

The operation of my invention as follows: At the same time that the plow is turning the furrow, the roller-wheel H is running on the furrow that has been previously turned, thereby breaking the clods and preventing them from baking in the sunshine, and thereby preserving their moisture. The harrow, which trails in rear of the roller-wheel, stirs and pulverizes the soil and puts it in condition for planting, thereby enabling the corn-planter to be run in rear of the sulky-plow, and thus enabling the farmer to plant the ground simultaneously with the operation of plowing, rolling, and harrowing the same, thus enabling him to do his work much more expeditiously, and giving him the advantage of planting the seeds while the ground is moist.

Having thus described my invention, I claim—

1. A sulky-plow having the roller-wheel H and the harrow trailing in rear of the said wheel, substantially as described.

2. The sulky-plow having the roller-wheel H on one side and the harrow hinged to the spindle on which the said wheel is mounted and trailing in rear of the said roller-wheel, substantially as described.

3. The sulky-plow having the roller-wheel H on one side and the harrow hinged to the spindle on which the said wheel is mounted and trailing in rear of the said roller-wheel, and the hand-lever attached to the harrow, to raise or lower the same, substantially as described.

4. The combination, with a sulky-plow, of the block D, and means for attaching it to one of the spindles of the axle, the hand-lever pivoted to the said block, and the spindle G, projecting outwardly therefrom, the roller-wheel H, mounted on the spindle G, and the harrow in rear of the roller-wheel and having the side beams provided with forward extensions K', pivoted on the spindle G on opposite sides of the roller-wheel, the said harrow being connected to the hand-lever, for the purpose set forth, substantially as described.

In testimony that I claim the foregoing as my own I have hereto affixed my signature in presence of two witnesses.

JAMES THORNTON STRONG.

Witnesses:
EDWARD S. SANDS,
M. E. JOHNSON.